United States Patent [19]

Koontz

[11] Patent Number: 4,679,331
[45] Date of Patent: Jul. 14, 1987

[54] APPARATUS AND METHOD FOR DETERMINING CONTOUR CHARACTERISTICS OF A CONTOURED ARTICLE

[75] Inventor: Harry S. Koontz, Penn Hill, Pa.
[73] Assignee: PPG Industries, Inc., Pittsburgh, Pa.
[21] Appl. No.: 768,384
[22] Filed: Aug. 26, 1985
[51] Int. Cl.[1] .............................................. G01B 7/28
[52] U.S. Cl. ...................................... 33/551; 33/1 M; 33/503
[58] Field of Search ............. 33/551, 504, 1 CC, 1 M, 33/503, 553

[56] References Cited

U.S. PATENT DOCUMENTS

| | | | |
|---|---|---|---|
| 3,135,055 | 6/1964 | Butler et al. | 33/504 X |
| 3,311,233 | 3/1967 | Helmbrecht et al. | 209/73 |
| 3,470,739 | 10/1969 | Takafuji et al. | 33/504 X |
| 3,500,379 | 3/1970 | Gibbons et al. | 33/1 M |
| 3,561,125 | 2/1971 | Zeidler | 33/1 M |
| 3,733,704 | 5/1973 | Farabaugh . | |
| 3,869,800 | 3/1975 | Bartlett et al. | 33/504 |
| 4,221,053 | 9/1980 | Bobel, II et al. . | |
| 4,419,672 | 12/1983 | Hird | 33/1 M |
| 4,477,973 | 10/1984 | Davies | 33/1 CC |

Primary Examiner—William D. Martin, Jr.
Attorney, Agent, or Firm—Donald Carl Lepiane; Robert A. Westerlund, Jr.

[57] ABSTRACT

An inspection apparatus includes a checking fixture having an article supporting surface having a contour representative of the desired/ideal peripheral marginal edge contour of a contoured article to be inspected, such as a bent glass sheet, e.g. an automotive lite. The article is supported by the article supporting surface of the fixture. The apparatus further includes position-sensing facilities, e.g. a linear potentiometer, and facilitates, e.g. a robot, for moving the potentiometer about the periphery of the article to be inspected, to generate a plurality of signals indicative of the gap between a plurality of predetermined points around the marginal edge periphery of the article supporting surface and a corresponding plurality of points around the marginal edge periphery of the article. The apparatus further preferably includes a computer or the like for processing the generated signals to provide information about the contour characteristics of the article, e.g. bend, sag, kink, or the like. Also disclosed herein is a method for using the apparatus of this invention.

14 Claims, 2 Drawing Figures

APPARATUS AND METHOD FOR DETERMINING CONTOUR CHARACTERISTICS OF A CONTOURED ARTICLE

FIELD OF THE INVENTION

The present invention relates generally to an apparatus for and method of inspecting the contour of articles, and more particularly, to an apparatus and method for determining the edge fit of a bent glass sheet, e.g. an automotive lite, relative to a reference or check fixture.

DESCRIPTION OF THE PRIOR ART

Glass sheets which are employed for glazing vehicles, e.g. automobiles, must be bent to precisely defined curvatures or contours in order to ensure proper fit of a given sheet within a vehicular lite fixture adapted to receive and retain the sheet. More particularly, the gap or deviation between the contoured marginal edge periphery of the sheet and the contoured supporting surface of the vehicular lite fixture should be within prescribed tolerances in order to facilitate proper installation of the lite within the fixture and to ensure adequate performance of the lite thereafter. Therefore, it is desirable to inspect the sheets in the production facility for quality control purposes, and to provide process feedback information to detect process flaws to minimize production of bent glass sheets which are without the allowable tolerances, (i.e. "out-of-spec") and therefore unacceptable. In this regard, it has been common practice to employ a checking fixture which has a glass sheet supporting surface conforming to the contour desired in the glass sheets, i.e. the checking fixture simulates the vehicular lite fixture wherein the sheets are to be employed for their end-use. In general, a bent glass sheet to be inspected is placed upon the contoured sheet supporting surface of the checking fixture and, if in agreement or conformity therewith, is found to be acceptable.

Various devices have been utilized to facilitate the determination of the gap or deviation, if any, between the sheet and the checking fixture. The earliest used devices include feeler gauges and calibrated wedges which are manually inserted between the contoured sheet supporting surface of the checking fixture and the supported marginal edge periphery of the sheet being inspected at various intervals or points around the periphery of the sheet. It can be appreciated that these inspection procedures are slow and tedious and prone to errors inherent in human judgment. More sophisticated inspection devices were then developed in an effort to overcome the above-delineated shortcomings of the manually manipulated devices. U.S. Pat. No. 3,311,233 issued to W. L. Helmbrecht et al. teaches a system for inspecting bent sheet materials including positioning the bent sheet to be inspected between complementary contoured checking surfaces and automatically indicating and recording the conformity of the sheet with the checking surfaces. However, the Helmbrecht et al. system is limited in that it only measures the greatest point of deviation between the checking surfaces and the bent sheet, and does not indicate the location or magnitude of the individual deviations. Further, U.S. Pat. Nos. 3,733,704 and 4,221,053 teach inspection apparatuses generally including a checking fixture having a plurality of probe assemblies mounted at spaced points around the periphery of the fixture. The probe assemblies generate linear signals representative of the deviation, if any, between the sheet being inspected and the sheet supporting surface of the checking fixture, at each of the spaced points. The linear signals are transmitted to a controller which, in turn, converts these signals into data displayed on a video screen in selectively different forms. The above-described apparatuses of U.S. Pat. Nos. 3,733,704 and 4,221,053 require calibration and maintenance of the multiplicity of probes used, and are physically limited in the number of checking points which can be employed. Further, in order to check a part having a different desired contour, it is necessary to remove the probes from one checking fixture and remount them onto the checking fixture embodying the different desired or ideal contour. It would be advantageous to have an inspection apparatus and method which overcomes the drawbacks and limitations of the prior art devices of the above-described type.

SUMMARY OF THE INVENTION

The present invention encompasses an apparatus for and method of determining contour characteristics of an article, e.g. a bent glass sheet, such as an automotive lite. The apparatus includes a checking fixture having an article supporting surface having a contour representative of the desired/ideal peripheral marginal edge contour of the article. The article is supported by the article supporting surface of the fixture. The apparatus further includes a probe, e.g. a linear displacement transducer, and facilitates, e.g. a robot, for moving the probe about the periphery of the article, to generate a plurality of signals indicative of the distance or gap between a plurality of predetermined points around the periphery of the article supporting surface and a corresponding plurality of points around the marginal edge periphery of a major surface of the article. The apparatus preferably further includes facilities for processing the signals to generate information about the contour characteristics of the article, e.g. bend, sag, and/or kink of a bent glass sheet, and/or gap between the article supporting surface and said major surface of the article supported thereby.

Also disclosed herein is a method for using the above-described apparatus of this invention.

DESCRIPTION OF THE INVENTION

Figure 1:
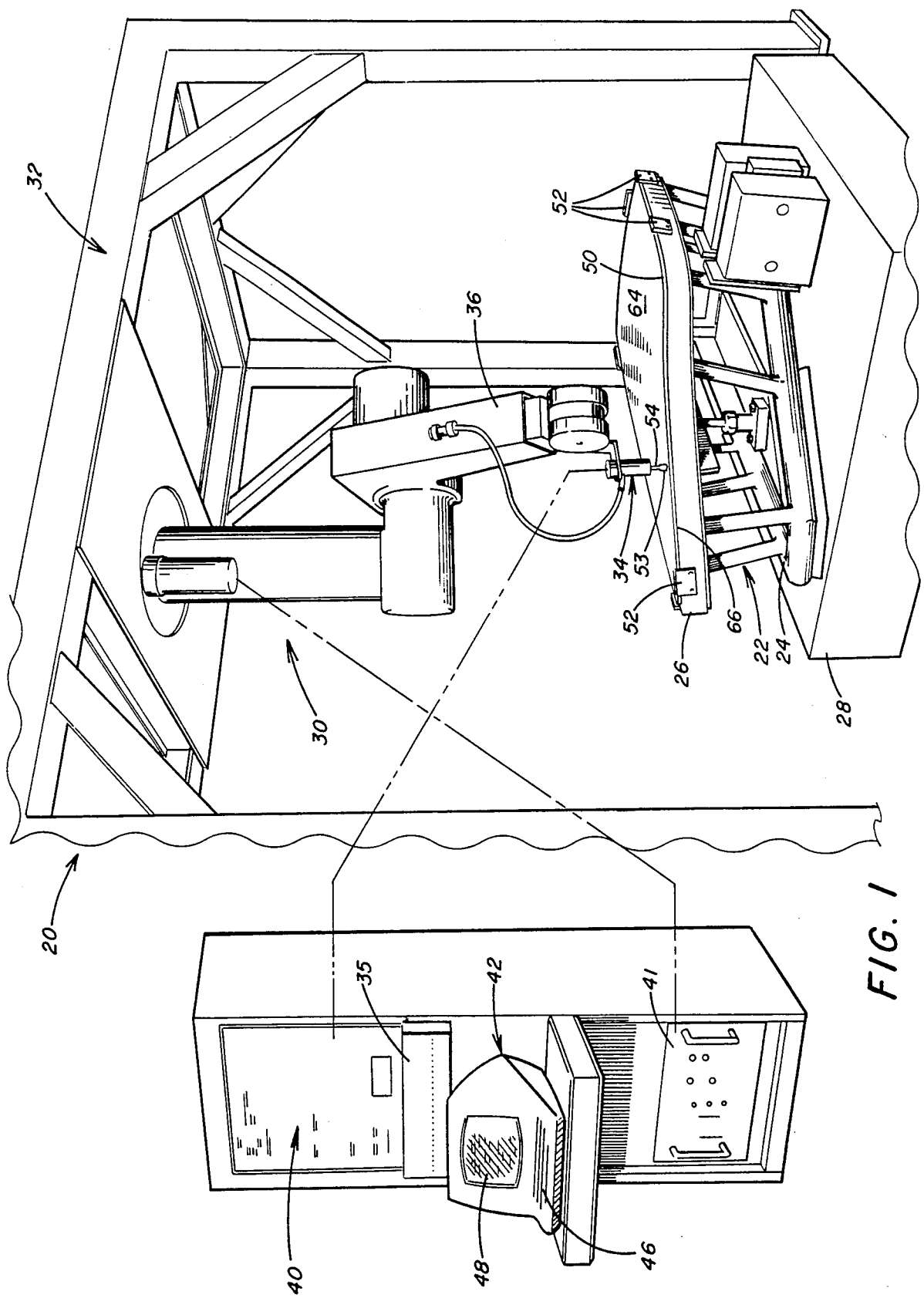
FIG. 1 is a perspective, diagrammatical view of an inspection apparatus embodying features of the present invention.

Referring now to FIG. 1, there can be seen an inspection apparatus 20 embodying features of the instant invention. The inspection apparatus 20 emcompasses a checking fixture 22 including a structural framework 24 and an article supporting surface 26. The article supporting surface 26 is conveniently formed from metal or plaster to the bent contour desired in the article to be inspected. Although the article supporting surface 26 preferably conforms precisely to the ideal contour desired or the exact contour intended to be imparted to the article to be inspected, it should be appreciated that the contour of the surface 26 is representative of only one desired contour and that the contour of the surface 26 can take widely, as dictated by the desired contour of the article to be inspected. The type of checking fixture 22 employed in the practice of this invention is not limiting to the invention, and any convenient type may suitably be employed, e.g. such as taught in U.S. Pat. No. 3,733,704 issued to Farabaugh and assigned to the assignee of the present invention, or U.S. Pat. No. 4,221,053 issued to Bobel, II et al., which teachings are herein incorporated by reference. The present invention will be described herein with relation to inspecting bent sheets of glass, especially automotive or aircraft lites or the like. However, it will be appreciated that the invention is not limited thereto, and can suitably be used to inspect other types of contoured articles, e.g. bent sheets of plastic, metal, or the like. Further, although not limiting to the invention, the checking fixture 22 may be supported on any convenient supporting surface, such as on a table 28.

Referring still to FIG. 1, the inspection apparatus 20 also includes a robot 30 or any other convenient controllable moving facilities. The robot 30 is preferably securely mounted to an overhead support structure 32, to extend vertically downwardly therefrom. A linear displacement transducer, e.g. a linear encoder (not shown) or a linear potentiometer 34, is securely mounted to the end of robot arm 36 by any suitable means, e.g. by means of an attachment bracket 38 or the like. As will hereinafter to be more fully appreciated, any other convenient position-sensing facilities may be employed in lieu of a linear displacement transducer, e.g. a fluid-operated position-sensing device; an optical sensor; a pressure probe; or any other suitable device, e.g. such as the device taught in U.S. Pat. No. 2,697,879 issued to W. S. Tandler et al., which teachings are herein incorporated by reference.

The inspection apparatus 20 preferably further includes a microcomputer 40, or any other convenient signal processing facility, functionally connected to both the linear potentiometer 34 and a computer 41 functionally connected to the robot 30, e.g. by means of an input/output (I/O) module 35, (see FIG. 2) or any other convenient means. The microcomputer 40 is preferably interfaced with an interactive console or terminal 42 and/or a printer 44. The terminal 42 includes a keyboard 46 functionally connected to a CRT visual display device or video monitor 48. However, it should be appreciated that a programmable controller or the like may be used in place of the microcomputer 40, such as taught in U.S. Pat. No. 4,221,053, and/or a histogram-type display device and/or strip-chart recorder or the like may be employed in lieu of the video monitor 48 and the printer 44, respectively, such as taught in U.S. Pat. No. 3,733,704.

In operation, the inspection apparatus 20 works in the following described manner. A command instruction is inputted via the keyboard 46, by a terminal operator or attendant, to initiate a "set up" mode of operation. The robot arm 36 is then manually or automatically moved to a position wherein the linear potentiometer 34 is disposed normal to a predetermined home or reference point on the article supporting surface 26 of the checking fixture 22. This position of the robot arm 36 will be referred to as the home position. The robot arm 36 is then manually or automatically moved downwardly in such a manner as to cause enlarged tip 53 of plunger 54 of the linear potentiometer 34 to contact or engage the article supporting surface 26 at the aforesaid reference point, such as to depress the plunger 54. The tip 53 is preferably made of nylon, rubber, or any other suitable non-marring material, and the plunger 54 is suitably spring-loaded.

Figure 2:
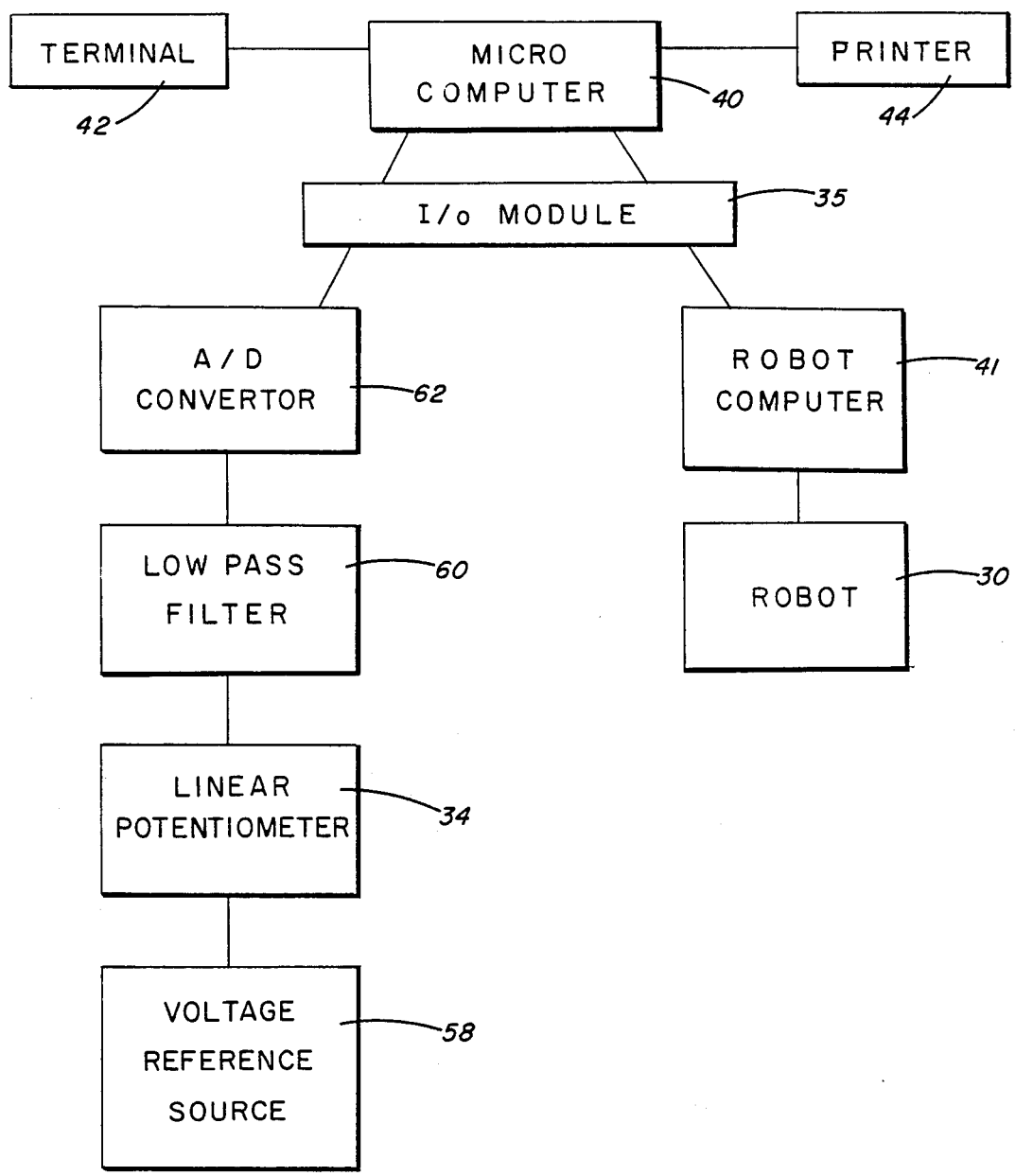
FIG. 2 is a flow chart diagram of the electrical system of the inspection apparatus depicted in FIG. 1.

The robot computer 41 is programmed, so that in the set up mode of operation, it causes the robot arm 36 and the linear potentiometer 34 attached thereto to move through a scanning or inspection path encompassing the marginal edge periphery of the article supporting surface 26, and preferably momentarily halts or stops the robot arm 36 at each of a plurality of preprogrammed points spaced around the marginal edge periphery of the article supporting surface 26. The number of checking points selected and the spacing between the points is completely arbitrary, depending only on the number of and location of the points which are desired to be checked on an article to be inspected. Also, microcomputer 40 is programmed, so that in the set up mode of operation, the position of the plunger 54 of the linear potentiometer 34, at each of the preprogrammed points, is determined and recorded in the memory module of the microcomputer 40. Preferably, the robot arm 36 is automatically stopped at each of the preprogrammed points prior to determination of the position of the plunger 54, to eliminate the effects of vibration of the robot arm 36 on the accuracy of the output signal of the potentiometer 34. The determination of the linear position of the plunger 54 is preferably accomplished in the following described manner. Referring additionally to FIG. 2, a precision voltage reference source 58, such as a ten volt precision voltage reference source chip of the type sold by Analog Devices, Inc., is electrically connected to the voltage input of the linear potentiometer 34. The voltage reference source 58 is preferably employed to prevent normal plant voltage variations or the like from affecting the output or displacement signal of the potentiometer 34. The potentiometer 34 transmits an anlog output voltage through a filter 60 and an analog-to-digital (A/D) converter 62 to the microprocessor module of the microcomputer 40. The filter 60 is preferably a low pass filter which functions to remove false signal variations that may result from such things as mechanical vibrations in the robot arm 36, even after it has been momentarily stopped. The A/D converter 62 digitizes the filtered or conditioned analog output voltage signal transmitted by the potentiometer 34 at each of the preprogrammed checking points. Finally, the digitized signal is delivered to the microcomputer 40. The magnitude of each digitized signal received by the microcomputer 40 is proportional to the displacement of the plunger 54 of the potentiometer 34 at each corresponding checking point. The microcomputer 40 stores each digitized signal in its memory at the same time as it receives the signal. The memory format is preferably in the form of a "setup" table or matrix which simply lists the value of each of the digitized signals and the number of each of the corresponding checking points.

After the set up mode of operation is completed, the robot arm 36 is moved to an out-of-the-way position, and then a bent sheet of glass, e.g. an automotive lite 50, to be inspected, is manually or automatically loaded or placed onto the article supporting surface 26 of the checking fixture 22. In this regard, a plurality of upright plates or guide brackets 52 are mounted to the outer edge of the article supporting surface 26, preferably adjacent to the corners thereof, to facilitate ready and accurate placement of the lite 50 to be inspected on the checking fixture 22. A command instruction is then inputted via the keyboard 46 to initiate the inspection mode of operation. The robot computer 41 is programmed, so that in the inspection mode of operation, the robot arm 36 is automatically moved to the home position and thereafter moved through the same scanning or inspection path, and stopped at the same preprogrammed checking points, as in the set up mode of operation, except that the tip 53 of the potentiometer plunger 54 engages the upper surface 64 of the lite 50 rather than the article supporting surface 26. The magnitude of the digitized signal received by the microcomputer 40 at each checking point will be different from the magnitude of the digitized signal received by the microcomputer 40 at each checking point when in the set up mode of operation, due to the thickness of the lite 40 being inspected plus any gap which may exist between the bottom surface 66 of the marginal edge periphery of the lite 50 and the marginal edge periphery of the article supporting surface 26 of the checking fixture 22. The microcomputer 40 stores each digitized signal in its memory, just as it does when in the set up mode, at the same time as it receives the signal. The memory format is preferably in the form of a "part" table or matrix which simply lists the value of each of the digitized signals generated during the inspection mode of operation and the number of each of the corresponding checking points. At the conclusion of the inspection mode of operation, a part table will have been created that will correspond directly to the set up table.

Once the above-described tables have been established in the memory of the microcomputer 40, the data may be manipulated in any convenient manner to indicate which points, if any, around the marginal edge periphery of the lite 50, do not conform closely enough to the article supporting surface 26, i.e. which points, if any, are "out-of-spec." For example, the distance or gap between the marginal edge periphery of the lite 50 and the article supporting surface 26 at each or at selected ones of the checking points could be displayed on the video monitor 48 and/or hard-copied on the printer 44. The microcomputer 40 can easily make the gap determinations by merely subtracting the digitized signal values for each of the checking points in the setup table from the digitized signal values for each of the checking points in the part table, the resultant values being representative of the distance from the upper major surface 64 of the lite 50 to the article supporting surface 26, at each of the checking points. Therefore, since the thickness of the lite 50 is a known value which can be preinputted into the microcomputer 40 via the keyboard 46, the distance or gap between the bottom major surface 66 of the lite 50 and the article supporting surface can easily be calculated by converting the digitized signal values in electrical units to linear distance values in units of distance, since the digitized signals received by the microcomputer 40 from the potentiometer 34 are each proportional in a known manner to the displacement of the plunger 54 at each of the corresponding checking points. Once the conversion from electrical units to distance units is complete, the thickness of the glass can be directly subtracted from the aforesaid resultant values to yield the gap values at each of the checking points. Further, the maximum allowable tolerance or gap for each checking point can be inputted into the microcomputer 40, and the compter 40 can be programmed to compare the actual gap values with the maximum allowable gap values. If the actual gap value exceeds the maximum allowable gap value, at any selected one(s) of the checking points, then an audio and/or visual alarm (not shown) may be actuated. Alternatively, the video monitor 48 and/or the printer 44 may display or print out, respectively, a list of the checking points, if any, wherein the gap exceeds the prescribed limit.

Further, various other calculations can be made by manipulating the data generated during inspection of the lite 50. For example, as the robot arm 36 and the linear potentiometer 34 attached thereto move between the successive checking points, during the inspection mode of operation, a "bend" table may be created by subtracting the just acquired digitized signal value in the part table from the corresponding value in the set up table, then converting the resultant value to units of distance, and then adding the thickness of the lite 50 thereto. The resultant sum for each checking point is then placed in the bend table in the memory portion of the microcomputer 40. The formula may be otherwise stated as:

$$B_N = (S_N + T) - P_N,$$

where
$B_N$ = The bend of the lite 50 at a given checking point N, in units of distance, (e.g. inches);
$S_N$ = The digitized signal value of the potentiometer 34 during set up at the same given checking point N, converted into units of distance (e.g. inches);
$P_N$ = The digitized signal value of the potentiometer 34 during inspection of the lite 50 at the same given checking point N converted into units of distance (e.g. inches); and,
T = The thickness of the lite 50 (e.g. in inches).

The bend value $B_N$ at each given checking point N can then be compared to a predetermined maximum bend value or bend limit which can be inputted into the microcomputer 40 via the keyboard 46. If the actual bend value exceeds the bend limit at any selected one(s) of the checking points, an audio and/or visual alarm (not shown) may be actuated. Alternatively, the video monitor 48 and/or the printer 44 may display or print out, respectively, a list of the checking points, if any, wherein the bend exceeds the prescribed limit.

The microcomputer 40 may also be programmed to calculate kink over a given section of the marginal edge periphery of the lite 50, and then store the calculated kink values in a "kink" table in the memory of the computer 40. For example, to calculate kink over every three inches of the marginal edge periphery of the lite 50 scanned, the following formula may be used:

$$K_N = B_{N-6} - B_N$$

where
$K_N$ = kink or the rate of bend change, in units of distance per units of distance (e.g. in inches per three inches);
$B_{N-6}$ = The bend value calculated six checking points prior to the one just passed;
$B_N$ = The bend value at the checking point just passed.

If any kink value exceeds a predetermined kink value for that particular section of the marginal edge periphery of the lite 50, then that fact may be automatically indicated in a manner similar to that previously described with respect to gap and bend values. Many other calculations can also be made in addition to those herein described. For example, testing for sag of the lite 50 is similar to testing for bend. If points on the lite 50 inboard of the marginal edge periphery thereof are just considered additional points to be checked, then the only additional step necessary is to program the additional checking points into the robot computer 41 to ensure that the scanning or inspection path also encompasses the additional sag checking points.

The programmed robot movement. i.e. the scanning or inspection path, for a given checking fixture, e.g. the checking fixture 22, may be transmitted to a host computer (not shown), or permanently stored on a disc, diskette, or any other convenient medium, so that when that given checking fixture is needed in the future, the inspection path need not be re-programmed, but rather only the disc containing that program need be merely loaded into the robot computer 41 via a disc loader or the like (not shown). When a different checking fixture is require to inspect an article having a different desired contour than the lite 50, a new scanning or inspection path is established by programming the robot computer 41 in accordance with the parameters of the new checking fixture.

In the actual practice of the present invention, the robot 30 employed is a 6-axis overhead robot sold by Unimate, Inc. under their registered trademark PUMA ®. The linear potentiometer 34 employed is a spring-loaded, cermet-type linear potentiometer, Model No. 1421-29-2 sold by Beckman Instruments, Inc. The microcomputer 40 employed is a Motorola 6802 model. The PUMA ® robot is accurate within about ±0.004 inches (0.1 mm); the Beckman Model No. 1421-29-2 linear potentiometer has a linearity variation of about ±0.005 inches (0.13 mm); and, the thickness of bent glass sheets varies about ±0.002 inches (0.05 mm); therefore, theoretical measurement accuracy of the inspection system 20 of this invention, using the above-delineated components, is about ±0.0065 inches (0.17 mm). Further, an actually practiced embodiment of the present invention has inspected an automotive lite having a 100 inch (254 cm) perimeter in approximately 1½ minutes, with 200 equally spaced checking points (i.e. ½ inch (1.27 cm) apart) being used.

Although the present invention has been described in some detail, it should be clearly understood that many variations and/or modifications to the basic inventive concepts herein taught which may appear to those skilled in the pertinent art, fall within the spirit and scope of the present invention, which should be interpreted solely on the basis of the following claims.

What is claimed is:

1. An apparatus for determining contour characteristics of a shaped article, comprising:
   a supporting surface;
   first means for determining contour of said supporting surface;
   first means responsive to said first determining means for generating position reference points and reference values;
   second means for determining contour of an article while supported on said supporting surface;
   second means responsive to said second determining means and said first generating means for generating a thickness value for each position reference point; and
   third means responsive to said first and second generating means for determining contour characteristics of the shaped article.

2. An apparatus for determining contour characteristics of a shaped glass article, comprising:
   a supporting surface;
   first means for determining contour of said supporting surface;
   first means responsive to said first determining means for generating position reference points and reference values;
   second means for determining contour of an article while supported on said supporting surface;
   second means responsive to said second determining means and said first generating means for generating a thickness value for each position reference point; and
   third means responsive to said first and second generating means for determining contour characteristics of the shaped article.

3. The apparatus as set forth in claim 2, wherein said glass article comprises an automotive lite.

4. The apparatus as set forth in claim 1 wherein said first responsive means includes generating means for calculating distance between each of said position reference points along contour of said supporting surface.

5. The apparatus as set forth in claim 4, wherein it further comprises means for recording each said calculated distance.

6. The apparatus as set forth in claim 4 further comprising means for comparing thickness value for each position reference point with predetermined maximum allowable thickness value.

7. The apparatus as set forth in claim 2, wherein said supporting surface has a contour representative of the desired/ideal peripheral marginal edge contour of said glass article.

8. The apparatus as set forth in claim 1, wherein said third means includes means for determining bend, sag, and/or kink of said article, and/or gap between said supporting surface and a major surface of said article.

9. The apparatus as set forth in claim 8, wherein said first and second determining means includes a robot having an arm and, wherein further, said first and second generating means includes signal generating means mounted to said robot arm.

10. The apparatus as set forth in claim 9, wherein:
    said robot is operatively connected to a first computer;
    said signal generating means is operatively connected to a second computer; and,
    said first and said second computer are operatively interfaced.

11. The apparatus as set forth in claim 10, wherein said signal generating means comprises a linear displacement transducer or a linear encoder.

12. A method of determining contour characteristics of an article, comprising the steps of:
    determining contour of a supporting surface;
    positioning article on the supporting surface;
    determining contour of the article supported on supporting surface; and
    comparing contour of the supporting surface to contour of the article on the supporting surface to generate contour characteristics of the article.

13. The method as set forth in claim 12, wherein said comparing step includes the step of determining bend, sag, and/or kink of the article, and/or gap between the supporting surface and a major surface of the article.

14. The method as set forth in claim 12 wherein said determining step includes the steps of:
    establishing reference points along on the supporting surface;

said determining step includes:
  measuring distance at each reference point between unsupported surface of the article and the supporting surface to provide a measured distance for each reference point; and said comparing step includes:
  comparing the measured distances to reference points to determine contour of article; and
  comparing determined contour of the article to a desired contour.

* * * * *

UNITED STATES PATENT AND TRADEMARK OFFICE
CERTIFICATE OF CORRECTION

PATENT NO. : 4,679,331

DATED : July 14, 1987

INVENTOR(S) : Harry S. Koontz

It is certified that error appears in the above-identified patent and that said Letters Patent is hereby corrected as shown below:

On the title page
Application Serial No. should be "768,984" instead of "768,384".

Signed and Sealed this

Tenth Day of May, 1988

Attest:

DONALD J. QUIGG

Attesting Officer

Commissioner of Patents and Trademarks